US008648854B2

(12) United States Patent
Putnam et al.

(10) Patent No.: US 8,648,854 B2
(45) Date of Patent: Feb. 11, 2014

(54) INTERACTIVE METHOD FOR DESIGNING PARCELS

(75) Inventors: Christopher Eric Putnam, Henniker, NH (US); Mark W. Anderson, Manchester, NH (US)

(73) Assignee: Autodesk, Inc., San Rafael, CA (US)

( * ) Notice: Subject to any disclaimer, the term of this patent is extended or adjusted under 35 U.S.C. 154(b) by 1729 days.

(21) Appl. No.: 10/954,529

(22) Filed: Sep. 29, 2004

(65) Prior Publication Data

US 2005/0114017 A1    May 26, 2005

Related U.S. Application Data

(60) Provisional application No. 60/507,062, filed on Sep. 29, 2003, provisional application No. 60/507,080, filed on Sep. 29, 2003, provisional application No. 60/506,975, filed on Sep. 29, 2003, provisional application No. 60/506,974, filed on Sep. 29, 2003.

(51) Int. Cl.
*G06T 17/20* (2006.01)

(52) U.S. Cl.
USPC ........................................................ 345/423

(58) Field of Classification Search
None
See application file for complete search history.

(56) References Cited

U.S. PATENT DOCUMENTS

| 5,329,464 | A | * | 7/1994 | Sumic et al. ...................... 703/1 |
| 5,553,211 | A | | 9/1996 | Uotani |
| 5,555,354 | A | | 9/1996 | Strasnick et al. |
| 6,732,120 | B1 | | 5/2004 | Du |
| 6,907,364 | B2 | | 6/2005 | Poolla et al. |
| 6,912,692 | B1 | | 6/2005 | Pappas |
| 6,965,945 | B2 | | 11/2005 | Lin et al. |
| 7,054,741 | B2 | * | 5/2006 | Harrison et al. ............... 701/208 |
| 7,164,883 | B2 | | 1/2007 | Rappaport et al. |
| 2001/0049704 | A1 | | 12/2001 | Hamburg et al. |
| 2003/0158668 | A1 | * | 8/2003 | Anderson ......................... 702/5 |
| 2004/0004611 | A1 | * | 1/2004 | Komornicki et al. ......... 345/418 |
| 2004/0076279 | A1 | | 4/2004 | Taschereau |
| 2005/0034075 | A1 | | 2/2005 | Riegelman et al. |
| 2005/0068315 | A1 | | 3/2005 | Lewis et al. |

OTHER PUBLICATIONS

Gold, "Applications of dynamic voronoi data structures. In Oral Presentation," Second European Conference on Geographic Information Systems, Brussels, Belgium 1991, http://www.voronoi.com/pdfs/1990-1994/application_of_dynamic_voronoi_data_structures.pdf. Printed May 28, 2007.
Schneider et al., "GPU-friendly high-quality terrain rendering," Journal of the WSCG, vol. 14, 2006, http://wwwcg.in.tum.de/Research/data/Publications/wscg06.pdf.
Fowler et al., "Automatic extraction of irregular network digital terrain models," In Proc. ACM SIGGraph '79, pp. 199-207, 1979.

(Continued)

*Primary Examiner* — Daniel Hajnik
(74) *Attorney, Agent, or Firm* — Gates & Cooper LLP

(57) ABSTRACT

A CAD/GIS system that automatically generates faces within land site maps, by sliding or rotating line segments between boundaries given start points and other attributes. As the attributes are entered into the system, faces are automatically generated based on those attributes, which eases creation of lots within subdivisions.

24 Claims, 9 Drawing Sheets

(56) References Cited

OTHER PUBLICATIONS

Lindstrom et al, "Visualization of large terrains made easy," In Proc. IEEE Visualization '01, pp. 363-370, 2001.

Lindstrom et al., "Terrain simplification simplified: A general framework for view-dependent out-of-core visualization," IEEE Transactions on Visualization and Computer Graphics, 8(3):239-254, 2002.

Koller et al., "Virtual GIS: A real-time 3D geographic information system," In Proc. IEEE Visualization 95, pp. 94-100, 1995.

Suter et al., "Automated generation of visual simulation databases using remote sensing and GIS," In IEEE Visualization '95, pp. 86-93, 1995.

The Voronoi Web Site 1990-1995. http://www.voronoi.com/pubs_1990.htm. Printed on May 28, 2007.

Giordan et al. "Using Adobe Photoshop 5", Jul. 1998, published by Que, copyright 1998, pp. 128, 130-131, 346-351, 361.

Blatner et al. "Essential Photoshop 6 Tips", Aug. 13, 2001, via AdobePress www.adobepress.com/articles/printerfriendly.asp?p=22789, article courtesy of PeachPit Press.

* cited by examiner

INTERACTIVE METHOD FOR DESIGNING PARCELS

CROSS-REFERENCE TO RELATED APPLICATIONS

This application claims the benefit under 35 U.S.C. Section 119(e) of the following co-pending and commonly-assigned U.S. provisional patent applications, all of which are incorporated by reference herein:

Provisional Application Ser. No. 60/507,062, filed Sep. 29, 2003, by Christopher E. Putnam and Mark W. Anderson, entitled "PARCEL DESIGN AND PLANAR TOPOLOGY,";

Provisional Application Ser. No. 60/507,080, filed Sep. 29, 2003, by Sreenadha B. Godavarthy, John M. Lewis, Thomas M. Inzinga, Edward J. Connor, Robert B. Todd, Jr., and Christopher E. Putnam, entitled "SURFACE PROCESSING,";

Provisional Application Ser. No. 60/506,975, filed Sep. 29, 2003, by Kumud Dev Vaidya, Michael C. Rogerson, and Bhamadipati S. Rao, entitled "HORIZONTAL ALIGNMENT PROCESSING,"; and Provisional Application Ser. No. 60/506,974, filed Sep. 29, 2003, by Kumud Dev Vaidya, Michael C. Rogerson, and Bhamadipati S. Rao, entitled "VERTICAL ALIGNMENT PROCESSING,".

This application is related to the following co-pending and commonly-assigned patent applications, all of which are incorporated by reference herein:

Utility application Ser. No. 10/954,526, filed on Sep. 29, 2004, by Christopher E. Putnam and Mark W. Anderson, entitled "METHOD FOR DYNAMICALLY UPDATING A PLANAR TOPOLOGY,", now U.S. Pat. No. 7,634,149 issued on Dec. 15, 2009;

Utility application Ser. No. 10/953,806, filed on Sep. 29, 2004, by Sreenadha B. Godavarthy and John M. Lewis, entitled "SURFACE SMOOTHING TECHNIQUES,";

Utility application Ser. No. 10/953,807, filed on Sep. 29, 2004, by Kumud Dev Vaidya, Michael C. Rogerson, and Bhamadipati S. Rao, entitled "INTERACTIVE CONSTRAINT-BASED ALIGNMENT OBJECTS,", now U.S. Pat. No. 7,623,128 issued on Nov. 24, 2009;

Utility application Ser. No. 10/954,542, filed on Sep. 29, 2004, by Christopher E. Putnam and Mark W. Anderson, entitled "METHOD AND APPARATUS FOR AUTOMATICALLY DISCOVERING HIERARCHICAL RELATIONSHIPS IN PLANAR TOPOLOGIES,", now U.S. Pat. No. 7,617,077 issued on Nov. 10, 2009;

Utility application Ser. No. 10/953,934, filed on Sep. 29, 2004, by John M. Lewis, Thomas M Inzinga and Edward J. Connor, entitled "INTERACTIVE TRIANGULATED IRREGULAR NETWORK (TIN) SURFACES DESIGN,", now U.S. Pat. No. 7,561,990 issued on Jul. 14, 2009; and Utility application Ser. No. 10/953,245, filed on Sep. 29, 2004, by John M. Lewis, Robert B. Todd, Jr., Edward J. Connor, and Christopher E. Putnam, entitled "SURFACE CONSTRUCTION AUDIT TRAIL AND MANIPULATION,", now U.S. Pat. No. 7,523,396 issued on Apr. 21, 2009.

BACKGROUND OF THE INVENTION

1. Field of the Invention

The present invention relates generally to computer aided design (CAD) applications and geographic information systems (GIS), and in particular, to a method, apparatus, and article of manufacture for automatically discovering hierarchical relationships in planar technologies.

2. Description of the Related Art

Computer aided design (CAD) applications are traditionally used for creating and editing drawings (e.g., maps, floor plans, and engineering designs). Further, CAD applications enable users to create/modify highly precise and accurate drawings/maps. Civil engineers and surveyors, for whom precision and accuracy are of primary importance, have adopted CAD applications to speed data input and perform computations for design projects.

Geographic information systems (GIS) have been traditionally used for spatial analysis and mapping and allow users to store, retrieve, manipulate, analyze, and display geographically referenced data. However, traditional GIS have been aimed at general cartography and broad land-use analysis, and not precision design for the construction and management of real-world projects. In this regard, the geometric precision that many engineers require has not been provided by traditional GIS systems.

Some GIS companies have attempted to use complex databases to model real-world objects. However, such databases are still built on points, lines, and polygons and cannot store geometric objects in a traditional CAD application (e.g., true arcs or road spirals). As such, use of CAD systems in a GIS environment has been limited, because the results have been less than favorable.

Many organizations have used both CAD and GIS tools in different departments to utilize the different specific features available. Further, data from original CAD drawings may be frequently imported or digitized for use in the GIS mapping environment. However, because of the limitations of GIS systems and/or CAD systems, during such a transition, data connectivity, accuracy, and geometric precision are often lost. Accordingly, what is needed is an integrated solution that provides the functionality and tools of a GIS system with the precision and accuracy of a CAD application.

In an attempt to address the above concerns, industry specific components were built on top of the CAD engine to address specialized needs and eventually, an integrated solution was developed (e.g., Autodesk Map™ software available from the assignee of the present invention). Integrated solutions attempt to provide GIS functionality (e.g., multiuser editing, polygon overlay and analysis, topology, thematic mapping, etc.) within a CAD application and spatial database. The integrated solution allows civil engineers the ability to integrate the precision engineering tasks (from CAD) (e.g., site, roadway, and hydrological design) with the spatial analysis tools and data management of GIS. Such systems are known as CAD/GIS systems.

Nonetheless, the integrated solutions may have various limitations. As such, there is a need in the art that allows for the use of precision engineering CAD programs and systems in a GIS environment.

SUMMARY OF THE INVENTION

To minimize the limitations in the prior art, and to minimize other limitations that will become apparent upon reading and understanding the present specification, the present invention discloses a method and apparatus for automatically discovering hierarchical relationships in planar topologies.

Embodiments of the invention provide methods, apparatuses, and articles of manufacture for generating faces/parcels in a computer assisted design and geographic information (CAD/GIS) system. A method in accordance with the present invention comprises defining a site map within the CAD/GIS system, where the site map is defined by at least one boundary and encloses a closed polygon, defining a boundary of the site map within the CAD/GIS system to be used as a reference boundary, defining a start point on the reference boundary within the CAD/GIS system, and automatically generating at least one face/parcel with the CAD/GIS system within the site map, wherein the face/parcel is a closed polygon, wherein the face/parcel is generated based on at least one attribute of the face/parcel defined within the CAD/GIS system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a CAD/GIS system that automatically generates faces/parcels within data entries of site maps. The present invention can be used to subdivide root faces/parcels of land into residential and commercial lots or faces/parcels, as well as faces/right-of-ways and public areas. As the geographical and positional data for the site map for the entire face/parcel is entered into the CAD/GIS system, the root faces/parcels of land, lots, and other area definitions can be automatically generated based on user-defined parameters.

Hardware Environment

Figure 1:
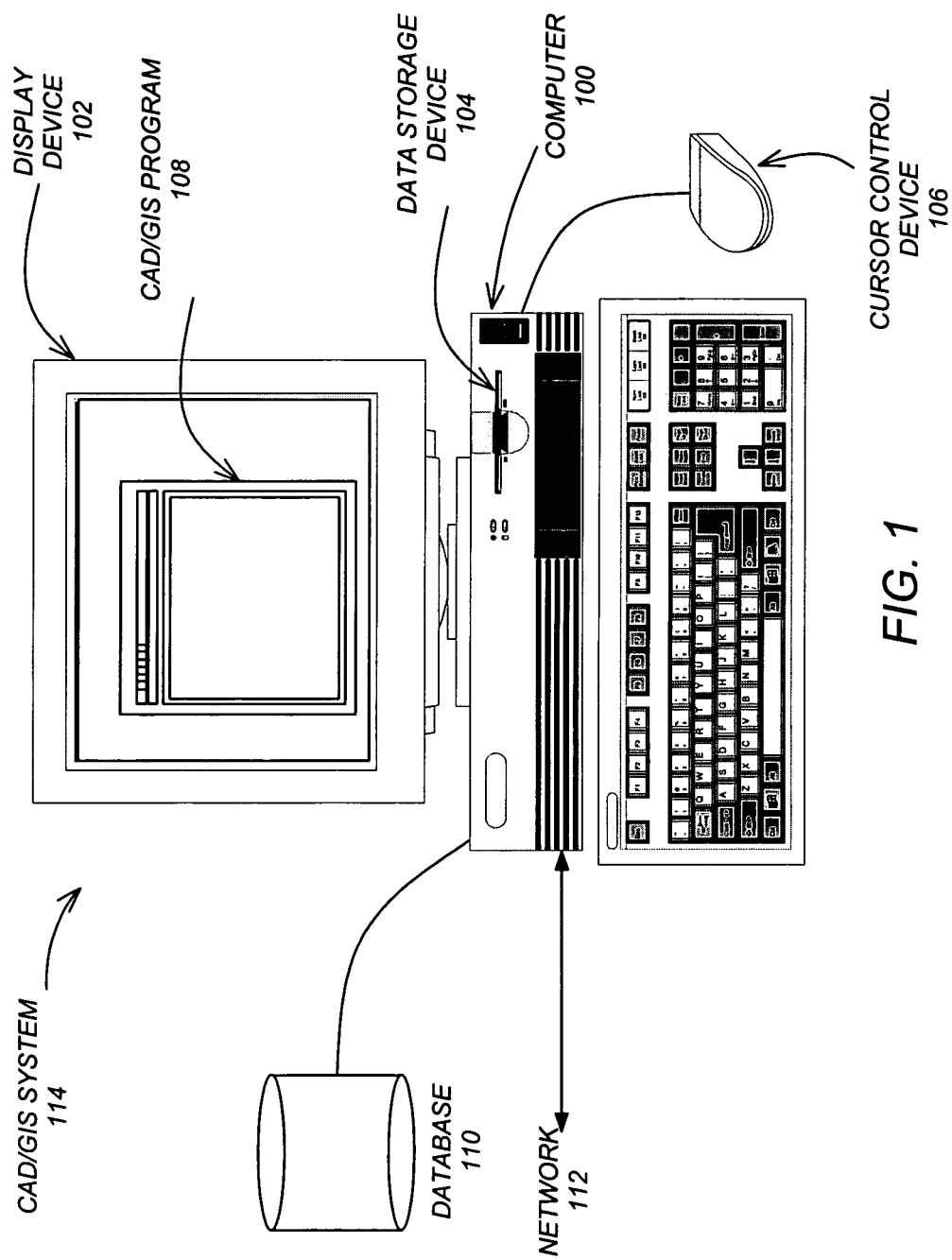
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented Computer Aided Design/Geographical Information System (CAD/GIS) program 108, wherein the CAD/GIS program 108 is represented by a window displayed on the display device 102. Preferably, the CAD/GIS program 108 comprises the AUTODESK LAND SOLUTIONS suite of products, which includes the AUTODESK LAND DESKTOP 2005 and AUTODESK CIVIL DESIGN 2005. More information on these products can be found in the manuals entitled, "Autodesk Land Desktop/Getting Started," March 2004 and "Autodesk Civil Design/Getting Started," March 2004, both of which are incorporated by reference herein.

Generally, the CAD/GIS program 108 comprises logic and/or data embodied in or readable from a device and/or media, e.g., one or more fixed and/or removable data storage devices 104 connected directly or indirectly to the computer 100, one or more remote devices coupled to the computer 100 via a data communications device, etc. Further, the CAD/GIS program 108 may utilize a database 110 such as a spatial database.

Computer 100 may also be connected to other computers 100 (e.g., a client or server computer) via network 112 comprising the Internet, LANs (local area network), WANs (wide area network), or the like. Further, database 110 may be integrated within computer 100 or may be located across network 112 on another computer 100 or accessible device.

Those skilled in the art will recognize that the exemplary environment illustrated in FIG. 1 is not intended to limit the present invention. Indeed, those skilled in the art will recognize that other alternative environments may be used without departing from the scope of the present invention. Accordingly, FIG. 1 illustrates an integrated CAD/GIS system 114 that combines the traditional capabilities of CAD and GIS tools with common spatial management features. In this regard, such an integrated solution enables the use of true geometry, precision, powerful creation and editing tools, and drawing and document production of a CAD system in addition to the GIS capabilities for polygons, topology, overlay analysis, seamless database use, and thematic mapping.

Discovering and Generating Hierarchical Relationships

The present invention allows for selective coupling of two or more planar topologies which allows for suitable update and query by the CAD/GIS program 108. The planar topologies, often referred to as "layers" or "levels" in a CAD system, allow for systematic and hierarchical arrangement of the features in the CAD/GIS program 108, which simplifies the management of such a system.

Figure 2:
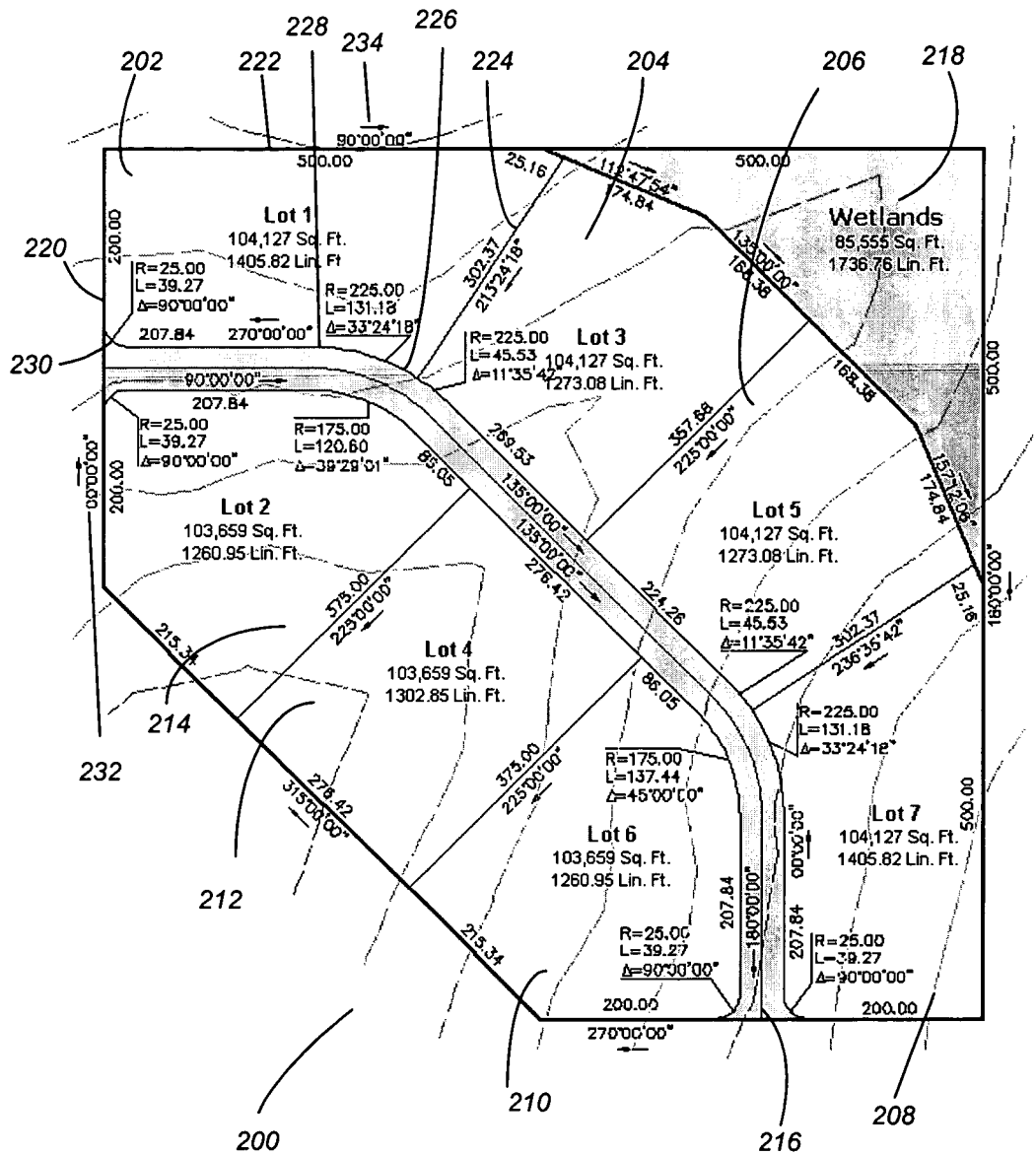
FIG. 2 illustrates a first graphical display of an embodiment of the present invention.

FIG. 2 illustrates a first graphical display of an embodiment of the present invention.

FIG. 2 shows site map 200, with faces/parcels 202, 204, 206, 208, 210, 212, and 214. As described herein, faces define any enclosed area. Further, parcels define faces that may be defined/described via a legal definition such as a definition described in accordance with the statutes, regulations, and ordinances of the State of California. Accordingly, faces may include parcels or any enclosed area that may be defined legally or otherwise. Thus, right-of-way 216 and wetlands 218 shown in FIG. 2 are also faces. Each face identified as a lot in FIG. 2 may by described using a legal definition and accordingly each such face may be a parcel.

Each face/parcel 202-214 contains displayed information such as frontage lines, square footage, linear footage, radii of curves, etc. Each face/parcel 202-214 is defined by boundaries such as lines, radii, curves, etc. that are joined to form a closed area. For example, and not by way of limitation, face/parcel 202 is defined by line 220, line 222, line 224, radius 226, line 228, and radius 230. Line 220 is defined as a straight line, two hundred feet long, in a northern direction (designated as 0 degrees, 0 minutes, and 0 seconds by designation 232). Line 222 is defined as a straight line, five hundred feet long, in an easterly direction (designated as 90 degrees, 0 minutes, and 0 seconds by designation 234). Lines 220, 222, 224, radius 226, line 228, and radius 230 form a closed area, which defines face/parcel 202. Boundary line 224 is shared with face/parcel 204, and helps define face/parcel 204 as well as face/parcel 202. Similarly, radius 226, line 228, and radius 230 abut right-of-way 216, and help to define face/right-of-way 216 as well as face/parcel 202.

The structure of the present invention allows for determination of areas and linear footage based on the boundaries and radii which are used to form faces/parcels 202-214. For example, and not by way of limitation, face/parcel 202 has an area of 104, 127 square feet, which is determined by the CAD/GIS program 108 using the area defined by the boundary lines 220-224, radius 226, line 228, and radius 230.

Face/Parcel Selection, Area Selection, and Automatic Creation

Face/parcel selection refers to the process of selecting a face/parcel area defined by a closed boundary of line and curve segments. Area selection is a concept that is not supported in base AutoCAD. Area selection is a critical feature for faces/parcels since so many operations depend on identifying one or more faces/parcels before proceeding.

Creating Faces/Parcels by Layout or Object

Faces/parcels 202-214 in the present invention can be created by layout, or by swinging or sliding a line segment about an arc. A command in the CAD/GIS program 108 entitled "Create Face/Parcel By Layout" will be accessible to the user and will enable the user to set specific properties for the command to be applied in a global sense throughout the CAD/GIS program 108. Settings to assist the user in laying out faces/parcels are supported in the drawing and face/parcel feature level of the CAD/GIS program 108. Faces/parcels 202-214 can also be created from objects in an object-oriented programming environment, and settings for the Create Faces/Parcels From Objects command are also supported at the drawing and face/parcel feature level, except for the automatically add segment labels and erase selected objects property.

Creating Faces/Parcels by Swinging Line Segment

The Create Face/Parcel By Swing Segment properties command dialog will include the drawing and face/parcel settings. The values shown in the value column of Table 1 represent the application defaults.

TABLE 1

| | Property | Value |
|---|---|---|
| | General | |
| ⊞ | Styles | |
| ⊞ | Operation Settings | |
| ⊞ | CreateParcelBySwingSeg | |
| ⊟ | Minimum area | 100.0000 |
| | Swing line segment counter clockwise | True |

The settings for the convert faces/parcels command are supported at the drawing and face/parcel feature level, except for the erase selected entities property.

The user is able to select a minimum face/parcel 202-214 area (e.g., square unit area) within the Create Face/Parcel By Swing Segment command. Once a minimum area is selected, each face/parcel will be automatically created with an area that has the user-defined minimum area enclosed within that face/parcel. Further, the user is able to select a direction in which to swing the line segment, typically defined in a clockwise direction. However, some faces/parcels may benefit from swinging the line segment in a counter-clockwise direction, and thus, the direction can be changed. In Table 1, to change the direction, the user would define the property as False.

For example, and not by way of limitation, a point is selected by the user within a site map 200. The Create Face/Parcel by Swing Segment can be used with a minimum face/parcel 200-214 size around that point being defined by the user, and the CAD/GIS program 108 of the present invention will create as many faces/parcels as possible based on swinging a line segment from the selected point to the edge of the site map 200 in the selected direction (clockwise or counter-clockwise). These faces/parcels 202-214 will typically be approximately pie-shaped.

The swing segment method creates a face/parcel 202-214 by rotating a line segment about a fixed point on the boundary of a selected site map 200 until a target area is defined. The newly created face/parcel 202-214 is generated based on the user selected settings for display of new faces/parcels within a site map 200. These settings are created in the face/parcel layout dialog, which can be a separate window or other dialog box used within the CAD/GIS program 108. The remainder of the site map 200 retains its original style and labeling.

The selected site map 200 which is used for the swing bearing method may not be of a size or shape that can resolve a new face/parcel with this method. For example, and not by way of limitation, when this condition exists, a warning dialog will be displayed with an appropriate message to inform the user that this method cannot be used given the current settings.

Creating Faces/Parcels by Slide Line Segment

The Create Face/Parcel By Slide Segment properties command dialog will include the drawing and face/parcel settings. The values shown in the value column of Table 2 represent the application defaults.

TABLE 2

| | Property | Value |
|---|---|---|
| ⊞ | General | |
| ⊞ | Styles | |
| ⊞ | Operation Settings | |
| ⊟ | CreateParcelBySlideSeg | |
| | Minimum area | 100.0000 |
| | Apply minimum frontage | True |
| | Minimum frontage | 50.0000 |
| | Line segment angle is relative to parcels | True |
| | Slide line segment counter clockwise | True |

As with the Create Face/Parcel By Swing Segment command, creating faces/parcels by sliding the segment has a minimum area, e.g., square unit area, that can be user defined. So, for example, and not by way of limitation, some municipalities require a minimum lot size of one (1) acre per lot or face/parcel. So, the user can define a minimum face/parcel 202-214 size of one (1) acre and every automatically generated face/parcel 202-214 generated by the CAD/GIS program 108 will have a minimum size of one acre.

Further, the slide segment command allows for a minimum frontage along another face (or boundary or object) such as a roadway, stream, or other defined line such that each face/parcel 202-214 has at least a minimum frontage to that specific line. For example, and not by way of limitation, some municipalities have a minimum frontage to streets (e.g., right-of-way 216), and so the user can define, within the CAD/GIS program 108, a minimum frontage value such that automatically generated faces/parcels 202-214 have such a minimum frontage.

When sliding a line segment, the user can define whether the line segment is to be slid from right to left, or from left to right. This is similar to the clockwise/counterclockwise rotation of the Swing Line Segment command discussed hereinabove, and, as such, is defined as a clockwise (left to right) or counterclockwise (right to left) true/false flag, but can be defined differently if desired without departing from the scope of the present invention.

When sliding the line segment, the user can also define whether the next line segment should be parallel to the first line segment, or perpendicular to or at a selected angle from the line from which the sliding line segment is sliding along (e.g., an angle may be specified or selected from a list of predefined angles). Examples of the differences for these values will follow in relation to the figures.

Figure 3:
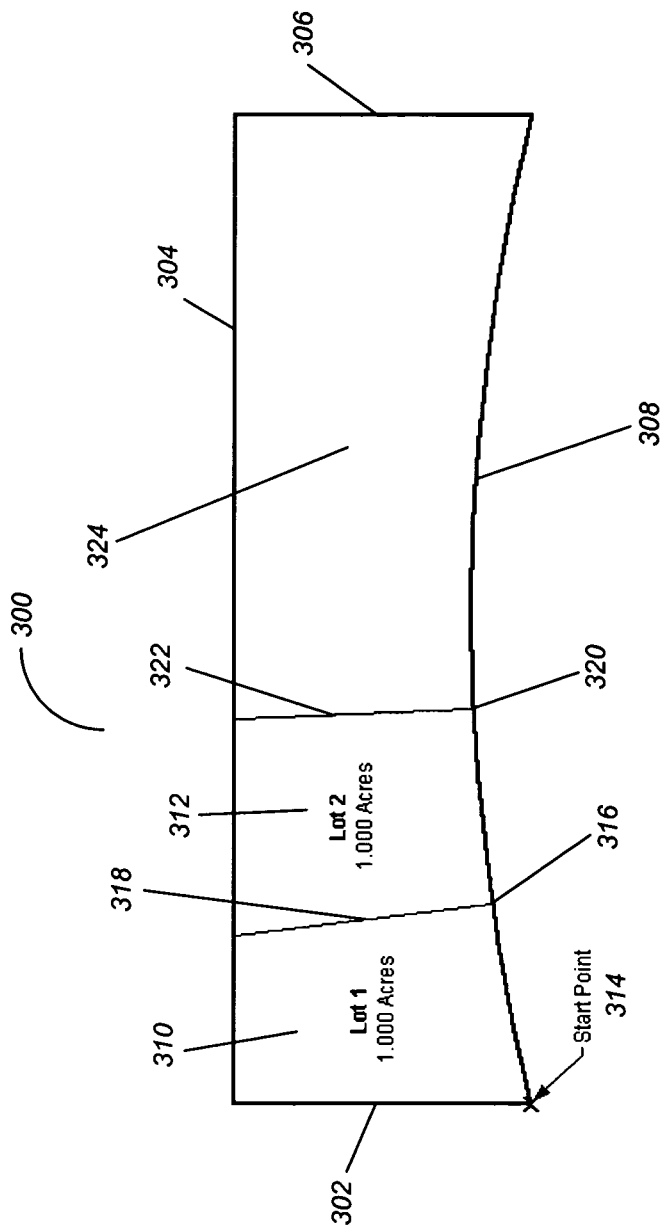
FIG. 3 illustrates an example of the use of the face/parcel generation command as used in the present invention.

FIG. 3 illustrates an example of the use of the face/parcel generation command as used in the present invention.

Site map 300 with boundaries 302, 304, 306, and 308 is shown. The user can define specific attributes within the CAD/GIS program 108, as described above, to automatically generate faces/parcels given those attributes.

In this instance, the user has selected face/parcel attributes of a minimum area of one (1) acre face/parcel size, and a minimum frontage of 100 feet for each face/parcel created. Further, the user has selected that the segment angle shall be perpendicular to the boundary segment selected, and that the direction of calculation or creation of faces/parcels shall be in a clockwise direction. The user has also selected the number of faces/parcels to be created, in this case, two, and that if there is any area left over within the site map 300, that it is not to be distributed evenly among the created faces/parcels.

When the user initiates the Create Face/Parcel by Sliding Segment command, faces/parcels 310 and 312 are created. Starting from start point 314, the CAD/GIS program 108 calculates a frontage of at least 100 feet from start point 314 along boundary 308, to determine point 316. The CAD/GIS program 108 then generates a line segment 318 starting from point 316, and perpendicular to the boundary 308 as defined by the user in this example. Line segment 318 is then attached to the other boundary 304 in a manner that generates a face/parcel 310.

The CAD/GIS program 108 takes into account the different attributes that have been defined by the user in determining the face/parcel 310 size, shape, and direction of line segment 318. For example, point 316 may not be exactly 100 feet from start point 314; however, having point 316 exactly 100 feet from start point 314 may result in face/parcel 310 being smaller than the defined face/parcel size of one acre. So, CAD/GIS program 108 moves point 316 farther away from start point 316 such that face/parcel 310 has a size of at least one acre.

Similarly, CAD/GIS program then generates face/parcel 312, because the user has defined the number of faces/parcels to be generated as two faces/parcels. Again, CAD/GIS program 108 calculates a point 320 as the start of a line segment 322 which is perpendicular to boundary 308, and the line segment 322 is terminated at boundary 304, generating face/parcel 312 with the requisite minimum size of one acre and required minimum frontage along boundary 308 of 100 feet. In essence, the minimum frontage value sets the target frontage length for the face/parcel 312. The frontage length is measured along the faces/parcels segments that are adjacent to the boundary 308. The slide bearing method calculates a face/parcel 312 with a frontage as close to the specified length without going under the specified value while still maintaining the other attributes, e.g., minimum face/parcel size.

The remainder 324 of the area of site map 300 is not divided into faces/parcels because the CAD/GIS program 108 was given an instruction by the user not to distribute the remainder 324 among the created faces/parcels 310 and 312. As such, remainder 322 is left as unused or undesignated.

The automatic generation of faces/parcels 310 and 312, along with remainder 324, shows the user that the site map 300 can probably support additional faces/parcels within the site map 300. The user then has the opportunity to redefine the minimum face/parcel size, minimum lot frontage, number of faces/parcels, direction of line segment, and other properties to provide a different end result of the face/parcel generation when the Create Face/Parcel by Slide Line Segment command is executed in the CAD/GIS program 108.

Figure 4:
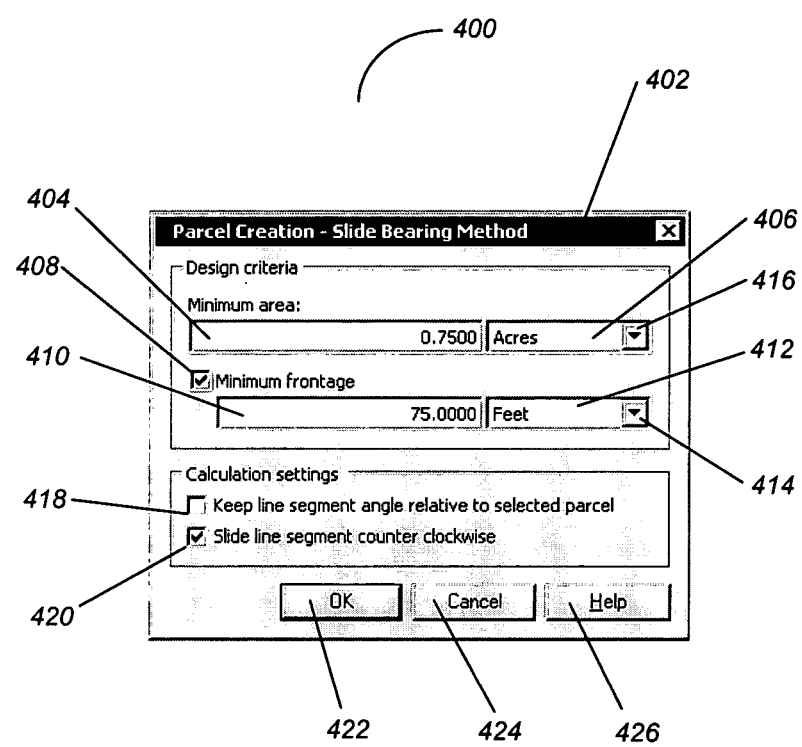
FIG. 4 illustrates the dialog window used with the create face/parcel by slide segment command as used in the present invention.

FIG. 4 illustrates the dialog window used with the create face/parcel by slide segment command as used in the present invention.

Dialog window 400 comprises a title bar 402 indicating that it is a creation by sliding line segment window. The user can enter minimum area numbers in box 404 and units in box 406.

The user can select whether a minimum frontage applies by checking checkbox 408, and enter the numerical value in box 410 and the units for the frontage in box 412. Dialog window 400 enables the user to select the units from a list by clicking on down arrow 414, as well as selecting area units by clicking on down arrow 416.

Other checkboxes that control user input are the checkbox 418 that changes the angle of the generated line segment to be perpendicular to the boundary segment selected, or, if desired, to keep the generated line segment angle relative to the selected face/parcel. In such a case, the parcel generated would have parallel line segments, rather than line segments perpendicular to the boundary segment selected. Finally, checkbox 420 allows the user to select the direction that the line segment will be slid across the site map 300. OK button 422 accepts the user input into CAD/GIS program 108, cancel button 424 cancels the user input from CAD/GIS program 108, and a help button 426 redirects the user to a help window.

Figure 5:
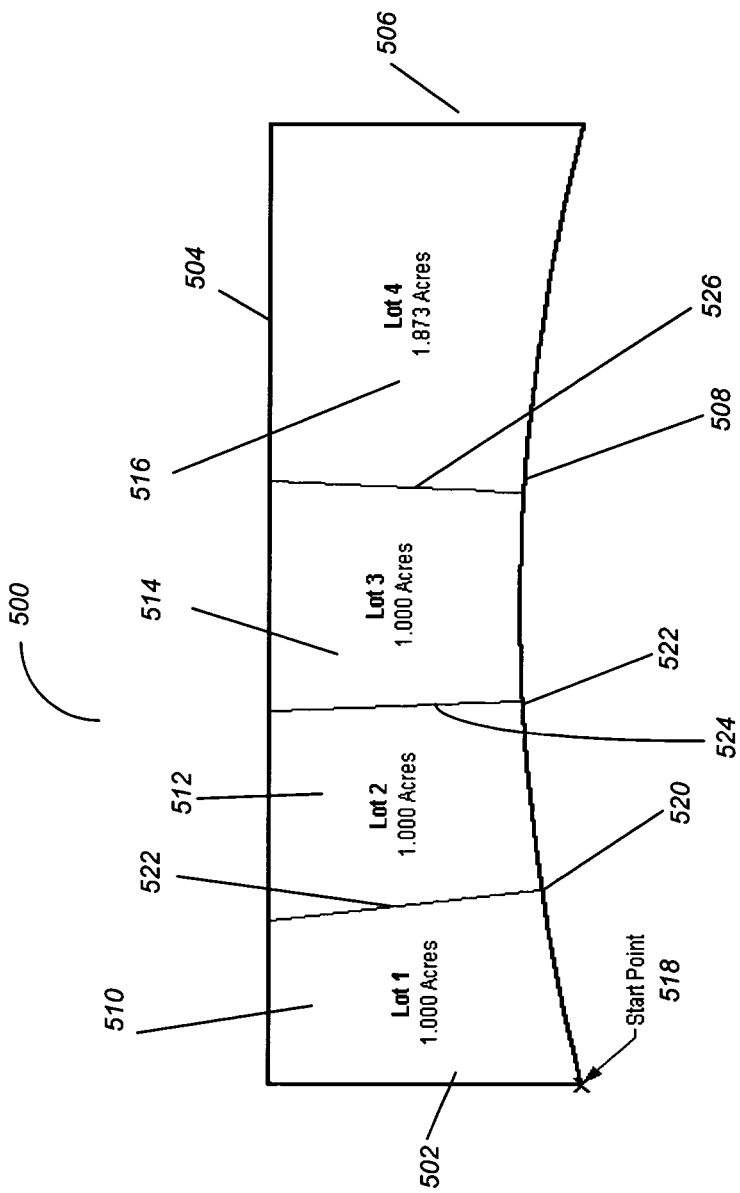
FIG. 5 illustrates another example of the use of the face/parcel generation command as used in the present invention.

FIG. 5 illustrates another example of the use of the face/parcel generation command as used in the present invention.

Site map 500 with boundaries 502, 504, 506, and 508 is shown. The user can define specific attributes within the CAD/GIS program 108, as described above, to automatically generate faces/parcels given those attributes.

In this instance, the user has selected face/parcel attributes of a minimum area of one (1) acre face/parcel size, and a minimum frontage of 100 feet for each face/parcel created. Further, the user has selected that the segment angle shall be perpendicular to the boundary segment selected, and that the direction of calculation or creation of faces/parcels shall be in a clockwise direction. The user has also selected the number of faces/parcels to be created, in this case, the user wants the CAD/GIS system 114 and the CAD/GIS program 108, to automatically generate as many faces/parcels as possible given the boundaries 502-508. Any area remaining within the site map 300 should not be distributed evenly among the generated faces/parcels, but should be added to the last face/parcel created.

When the user initiates the Create Face/Parcel by Sliding Segment command, faces/parcels 510, 512, 514, and 516 are created. Starting from start point 518, the CAD/GIS program 108 calculates a frontage of at least 100 feet from start point 518 along boundary 508, to determine point 520. The CAD/GIS program 108 then generates a line segment 522 starting from point 520, and perpendicular to the boundary 508 as defined by the user in this example. Line segment 522 is then attached to the other boundary 504 in a manner that generates a face/parcel 510. The CAD/GIS program 108 takes into account the different attributes that have been defined by the user in determining the face/parcel 310 size, shape, and direction of line segment 318. For example, point 316 may not be exactly 100 feet from start point 314; however, having point 316 exactly 100 feet from start point 314 may result in face/parcel 310 being smaller than the defined face/parcel size of one acre. So, CAD/GIS program 108 moves point 316 farther away from start point 316 such that face/parcel 310 has a size of at least one acre.

Similarly, CAD/GIS program 108 then generates faces/parcels 512-516, because the user has left it to CAD/GIS system 114 to generate as many faces/parcels as possible given the face/parcel constraints. Again, CAD/GIS program 108 calculates a point 522 as the start of a line segment 524 which is perpendicular to boundary 508, and the line segment 524 is terminated at boundary 504, generating face/parcel 512 with the requisite minimum size of one acre and required minimum frontage along boundary 508 of one hundred feet. In essence, the minimum frontage value sets the target frontage length for the face/parcel 512. The frontage length is measured along the faces/parcels segments that are adjacent to the boundary 508. The slide bearing method calculates a face/parcel 512 with a frontage as close to the specified length without going under the specified value while still maintaining the other attributes, e.g., minimum face/parcel size. CAD/GIS program 108 and CAD/GIS system 114 then generates face/parcel 514 in a similar manner by generating line segment 526.

The remainder of the area in site map 500 is larger than a single face/parcel size of one acre, but not large enough to generate two faces/parcels of the requisite minimum size. As such, and since the user has defined the variable within the CAD/GIS program 108 to add any extra area to the final generated face/parcel, CAD/GIS program 108 generates face/parcel 516, which has an area of 1.873 acres and a frontage on boundary 508 that is larger than the required minimum of one hundred feet.

Figure 6:
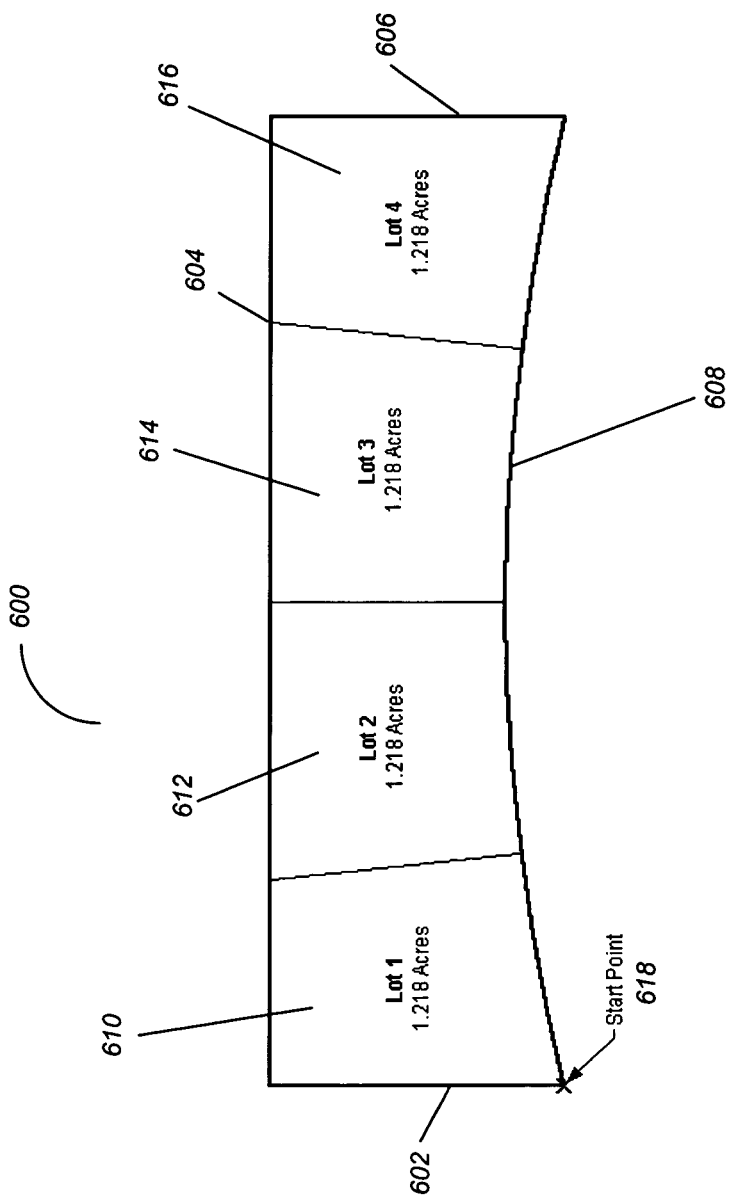
FIG. 6 illustrates another example of the use of the face/parcel generation command as used in the present invention.

FIG. 6 illustrates another example of the use of the face/parcel generation command as used in the present invention.

As with FIGS. 3 and 5, site map 600 with boundaries 602, 604, 606, and 608 is shown. In this instance, the user has programmed the CAD/GIS system 114 to calculate the area of each generated face/parcel, and has removed the minimum frontage requirement for each generated face/parcel. Further, the user has selected that the segment angle shall be perpendicular to the boundary segment selected, and that the direction of calculation or creation of faces/parcels shall be in a clockwise direction. The user has also selected the number of faces/parcels to be created; in this case, the user wants the CAD/GIS system 114 and the CAD/GIS program 108, to automatically generate as many faces/parcels as possible given the boundaries 602-608. Any area remaining within the site map 300 should also be distributed evenly among the generated faces/parcels.

When the user initiates the Create Face/Parcel by Sliding Segment command, faces/parcels 610, 612, 614, and 616 are created. Starting from start point 618, the CAD/GIS program 108 generates as many even-sized faces/parcels 610-616 as possible, and generates the line segments to separate the faces/parcels 610-616, each of the line segments being started from boundary 618 and terminated at boundary 604.

Figure 7:
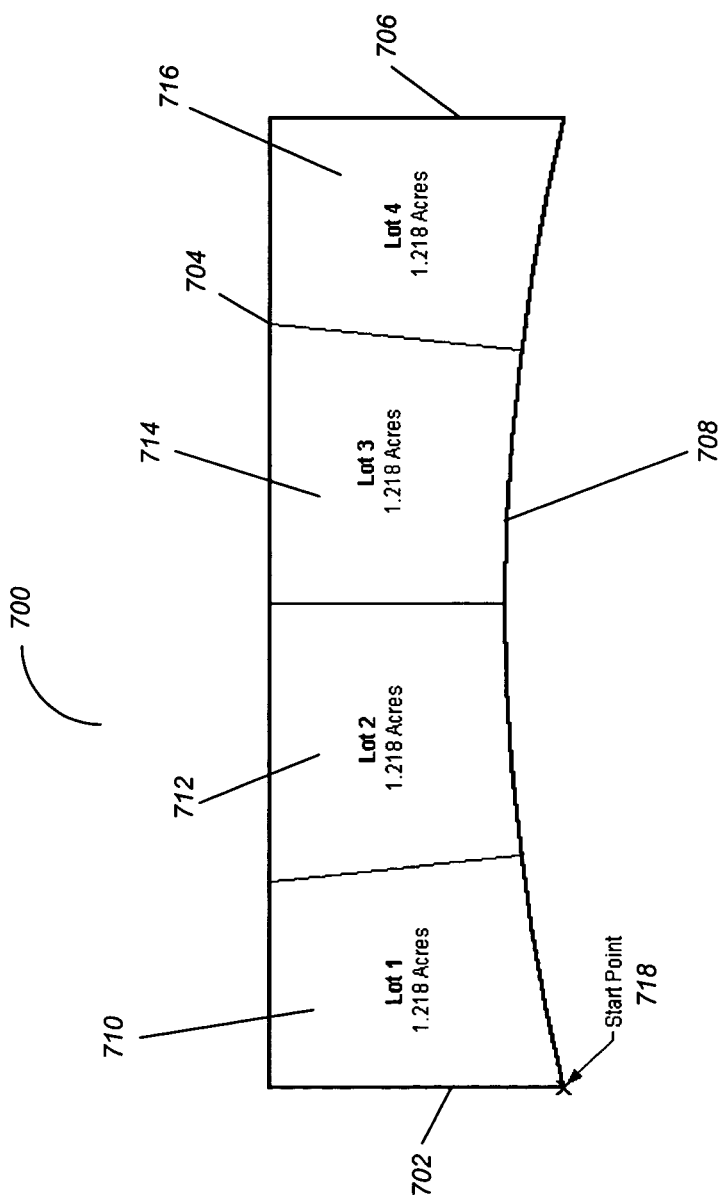
FIG. 7 illustrates another example of the use of the face/parcel generation command as used in the present invention.

FIG. 7 illustrates another example of the use of the face/parcel generation command as used in the present invention.

As with FIGS. 3, 5, and 6, site map 700 with boundaries 702, 704, 706, and 708 is shown. In this instance, the user has programmed the CAD/GIS system 114 to calculate the area of each generated face/parcel, and has removed the minimum frontage requirement for each generated face/parcel. Further, the user has selected that the segment angle shall be perpendicular to the boundary segment selected, and that the direction of calculation or creation of faces/parcels shall be in a clockwise direction. The user has also selected the number of faces/parcels to be created; in this case, the user wants the CAD/GIS system 114 and the CAD/GIS program 108, to generate four total faces/parcels within site map 700 given the boundaries 702-708. Any area remaining within the site map 300 should also be distributed evenly among the generated faces/parcels.

When the user initiates the Create Face/Parcel by Sliding Segment command, faces/parcels 710, 712, 714, and 716 are created. Starting from start point 718, the CAD/GIS program 108 generates four faces/parcels, each of an equal size. Although FIGS. 6 and 7 are similar in appearance, the results shown in FIGS. 6 and 7 were arrived at by using different logical steps within the CAD/GIS program 108, i.e., the data specified to CAD/GIS program 108 with regard to FIG. 6 was to generate as many faces/parcels as possible, whereas the data specified with regard to FIG. 7 was to generate only four faces/parcels. Such flexibility within the present invention allow different criteria selections, or approaches to face/parcel generation, to arrive at common or similar face/parcel layouts for any given site map 700.

Figure 8:
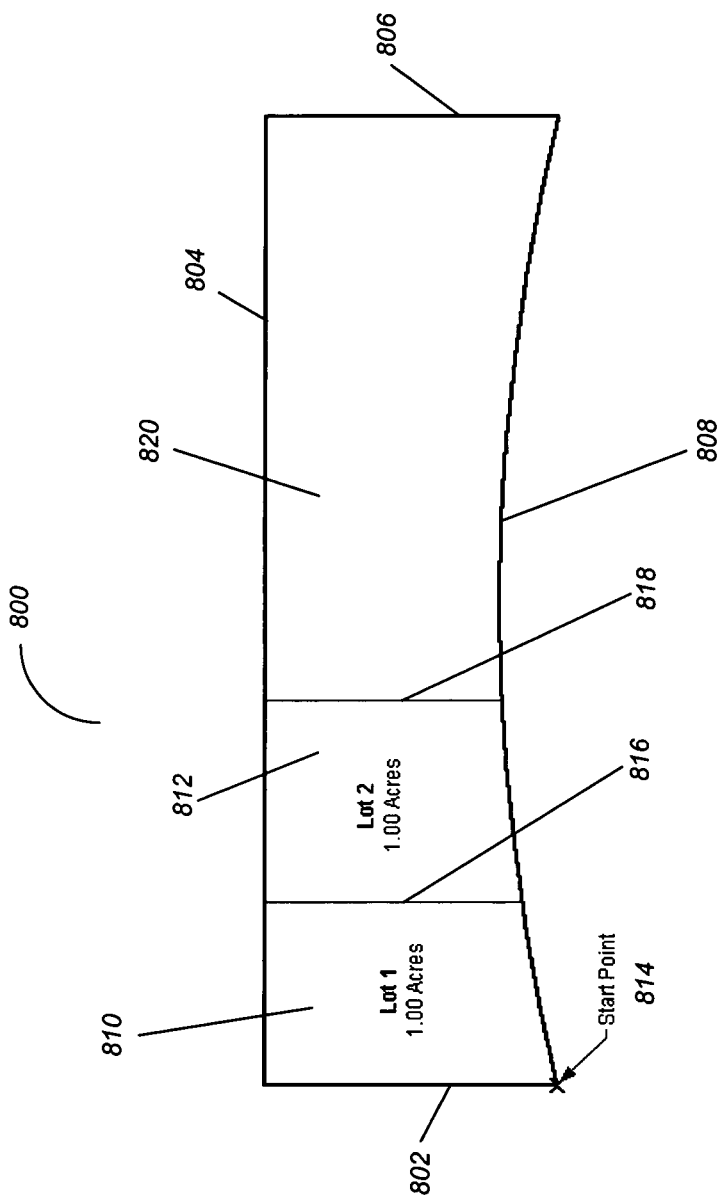
FIG. 8 illustrates another example of the use of the face/parcel generation command as used in the present invention.

FIG. 8 illustrates another example of the use of the face/parcel generation command as used in the present invention.

As with FIGS. 3, 5, 6, and 7, site map 800 with boundaries 802, 804, 806, and 808 is shown. In this instance, the user has programmed the CAD/GIS system 114 to generate faces/parcels with a minimum size of one acre, and has removed the minimum frontage requirement for each generated face/parcel. Further, the user has selected that the segment angle shall be at a fixed bearing of zero degrees relative to the site map 800. The user can also specify different angles, or specify that the line segment shall be parallel to another boundary, e.g., boundary 802, if such topography is desired for a given site map 800. The direction of calculation or creation of faces/parcels is specified by the user to be in a clockwise direction. The user has also selected the number of faces/parcels to be created; in this case, the user wants the CAD/GIS system 114 and the CAD/GIS program 108, to generate two total faces/parcels within site map 800 given the boundaries 802-808. Any area remaining within the site map 300 should not be distributed evenly among the generated faces/parcels.

When the user initiates the Create Face/Parcel by Sliding Segment command, face/parcels 810 and 812 are created. Starting from start point 814, the CAD/GIS program 108 generates two faces/parcels with minimum size of one acre and with line segments 816 and 818 in a zero degree orientation (vertical). Remainder 820 is not added to faces/parcels 816-818, but left for the user to provide further face/parcel generation commands or perform other functions.

The selected site map 800 to which the Create Face/Parcel by Slide Segment command is to be applied may not be of a size or shape that can resolve new faces/parcels with the slide bearing process. When this condition exists, a warning dialog will be generated by CAD/GIS program 108 and displayed with an appropriate message to indicate such issues to the user.

Flowchart

Figure 9:
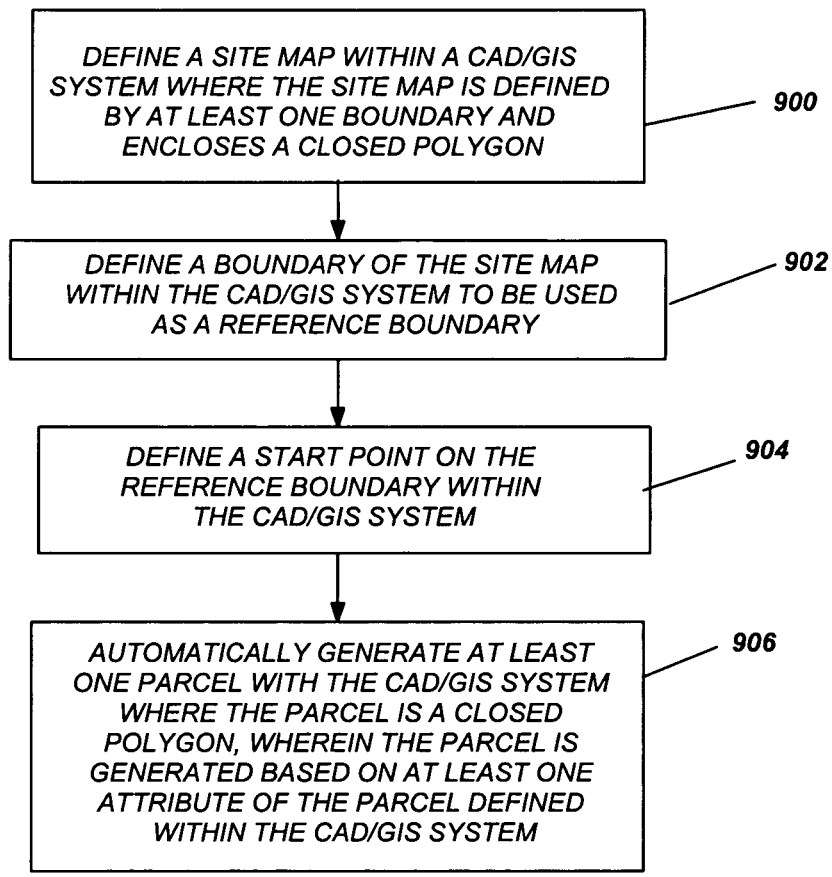
FIG. 9 is a flowchart illustrating the steps of the present invention.

FIG. 9 is a flowchart illustrating the steps of the present invention.

Box 900 illustrates performing the step of defining a site map within the CAD/GIS system, where the site map is defined by at least one boundary and encloses a closed polygon.

Box 902 illustrates performing the step of defining a boundary of the site map within the CAD/GIS system to be used as a reference boundary.

Box 904 illustrates performing the step of defining a start point on the reference boundary within the CAD/GIS system.

Box 906 illustrates performing the step of automatically generating at least one face/parcel with the CAD/GIS system within the site map, wherein the face/parcel is a closed polygon, wherein the face/parcel is generated based on at least one attribute of the face/parcel defined within the CAD/GIS system.

Within these steps, faces/parcels can be generated by the CAD/GIS system by rotating a line segment about the start point, or by sliding a line segment along the reference boundary. Attributes can be a minimum size for the face/parcel, a minimum frontage along the reference boundary where the face/parcel is generated by creating a side of the face/parcel lying along the reference boundary such that the side of the face/parcel has a length at least that of the minimum frontage attribute, or a number of faces/parcels to be generated by the CAD/GIS system. The area of the face/parcel size can also be increased by appending a remainder of area in the site map to the area of the face/parcel. The CAD/GIS system can also generate a line segment used to bound the face/parcel such that the line segment is perpendicular to the reference boundary, or generate a line segment used to bound the face/parcel such that the line segment is generated at a specified reference angle.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide methods, apparatuses, and articles of manufacture for generating parcels in a computer assisted design and geographic information (CAD/GIS) system. A method in accordance with the present invention comprises defining a site map within the CAD/GIS system, where the site map is defined by at least one boundary and encloses a closed polygon, defining a boundary of the site map within the CAD/GIS system to be used as a reference boundary, defining a start point on the reference boundary within the CAD/GIS system, and automatically generating at least one face/parcel with the CAD/GIS system within the site map, wherein the face/parcel is a closed polygon, wherein the face/parcel is generated based on at least one attribute of the face/parcel defined within the CAD/GIS system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

What is claimed is:

1. A method for creating faces in a computer assisted design and geographic information (CAD/GIS) system, comprising:
    defining a site map within the CAD/GIS system, where the site map is defined by at least one boundary and encloses a closed polygon;
    defining a boundary of the site map within the CAD/GIS system to be used as a reference boundary;
    defining a start point on the reference boundary within the CAD/GIS system;
    receiving, via user input, a definition of an attribute in the CAD/GIS system;
    automatically, without additional user input, creating at least one face with the CAD/GIS system within the site map, wherein the face is a closed polygon, wherein the face is created by creating at least one face boundary based on the start point and the attribute of the face defined within the CAD/GIS system, and wherein the face is created by rotating a line segment about the start point; and
    displaying the face in the CAD/GIS system on a display device.

2. A method for creating faces in a computer assisted design and geographic information (CAD/GIS) system, comprising:
    defining a site map within the CAD/GIS system, where the site map is defined by at least one boundary and encloses a closed polygon;
    defining a boundary of the site map within the CAD/GIS system to be used as a reference boundary;
    defining a start point on the reference boundary within the CAD/GIS system;
    receiving, via user input, a definition of an attribute in the CAD/GIS system;
    automatically, without additional user input, creating at least one face with the CAD/GIS system within the site map, wherein the face is a closed polygon, wherein the face is created by creating at least one face boundary based on the start point and the attribute of the face defined within the CAD/GIS system, and wherein the face is created by the CAD/GIS system by sliding a line segment along the reference boundary.

3. The method of claim 1, wherein the attribute is a minimum size for the face.

4. A method for creating faces in a computer assisted design and geographic information (CAD/GIS) system, comprising:
    defining a site map within the CAD/GIS system, where the site map is defined by at least one boundary and encloses a closed polygon;
    defining a boundary of the site map within the CAD/GIS system to be used as a reference boundary;
    defining a start point on the reference boundary within the CAD/GIS system;
    receiving, via user input, a definition of an attribute in the CAD/GIS system;
    automatically, without additional user input, creating at least one face with the CAD/GIS system within the site map, wherein the face is a closed polygon, wherein the face is created by creating at least one face boundary based on the start point and the attribute of the face defined within the CAD/GIS system, and wherein the attribute is a minimum frontage along the reference boundary, and the face is created by creating a side of the face lying along the reference boundary such that the side of the face has a length at least that of the minimum frontage attribute.

5. The method of claim 1, wherein the attribute is a number of faces to be created by the CAD/GIS system.

6. The method of claim 1, wherein an area of the face size is increased by appending a remainder of area in the site map to the area of the face.

7. The method of claim 1, wherein the CAD/GIS system creates a line segment used to bound the face such that the line segment is perpendicular to the reference boundary.

8. The method of claim 1, wherein the CAD/GIS system creates a line segment used to bound the face such that the line segment is created at a specified reference angle.

9. An apparatus for creating faces in a computer assisted design and geographic information (CAD/GIS) system, comprising:
(a) a computer system having a memory and a data storage device coupled thereto;
(b) one or more CAD/GIS programs, performed by the computer, for:
  (i) defining a site map within the CAD/GIS system, where the site map is defined by at least one boundary and encloses a closed polygon;
  (ii) defining a boundary of the site map within the CAD/GIS system to be used as a reference boundary;
  (iii) defining a start point on the reference boundary within the CAD/GIS system;
  (iv) receiving, via user input, a definition of an attribute in the CAD/GIS system;
  (v) automatically, without additional user input, creating at least one face with the CAD/GIS system within the site map, wherein the face is a closed polygon, wherein the face is created by creating at least one face boundary based on the start point and the attribute of the face defined within the CAD/GIS system, and wherein the face is created by rotating a line segment about the start point; and
  (vi) displaying the face in the CAD/GIS system on a display device.

10. An apparatus for creating faces in a computer assisted design and geographic information (CAD/GIS) system, comprising:
(a) a computer system having a memory and a data storage device coupled thereto;
(b) one or more CAD/GIS programs, performed by the computer, for:
  (i) defining a site map within the CAD/GIS system, where the site map is defined by at least one boundary and encloses a closed polygon;
  (ii) defining a boundary of the site map within the CAD/GIS system to be used as a reference boundary;
  (iii) defining a start point on the reference boundary within the CAD/GIS system;
  (iv) receiving, via user input, a definition of an attribute in the CAD/GIS system;
  (v) automatically, without additional user input, creating at least one face with the CAD/GIS system within the site map, wherein the face is a closed polygon, wherein the face is created by creating at least one face boundary based on the start point and the attribute of the face defined within the CAD/GIS system, and wherein the face is created by the CAD/GIS system by sliding a line segment along the reference boundary.

11. The apparatus of claim 9, wherein the attribute is a minimum size for the face.

12. An apparatus for creating faces in a computer assisted design and geographic information (CAD/GIS) system, comprising:
(a) a computer system having a memory and a data storage device coupled thereto;
(b) one or more CAD/GIS programs, performed by the computer, for:
  (i) defining a site map within the CAD/GIS system, where the site map is defined by at least one boundary and encloses a closed polygon;
  (ii) defining a boundary of the site map within the CAD/GIS system to be used as a reference boundary;
  (iii) defining a start point on the reference boundary within the CAD/GIS system;
  (iv) receiving, via user input, a definition of an attribute in the CAD/GIS system;
  (v) automatically, without additional user input, creating at least one face with the CAD/GIS system within the site map, wherein the face is a closed polygon, wherein the face is created by creating at least one face boundary based on the start point and the attribute of the face defined within the CAD/GIS system, and wherein the attribute is a minimum frontage along the reference boundary, and the face is created by creating a side of the face lying along the reference boundary such that the side of the face has a length at least that of the minimum frontage attribute.

13. The apparatus of claim 9, wherein the attribute is a number of faces to be created by the CAD/GIS system.

14. The apparatus of claim 9, wherein an area of the face size is increased by appending a remainder of area in the site map to the area of the face.

15. The apparatus of claim 9, wherein the CAD/GIS system creates a line segment used to bound the face such that the line segment is perpendicular to the reference boundary.

16. The apparatus of claim 9, wherein the CAD/GIS system creates a line segment used to bound the face such that the line segment is creates at a specified reference angle.

17. An article of manufacture comprising data embodied in a data storage device that is readable by and connected to a computer, and embodying one or more instructions executable by the computer to perform a method for automatically creating faces in a computer assisted design and geographic information (CAD/GIS) system, the method comprising:
defining a site map within the CAD/GIS system, where the site map is defined by at least one boundary and encloses a closed polygon;
defining a boundary of the site map within the CAD/GIS system to be used as a reference boundary;
defining a start point on the reference boundary within the CAD/GIS system;
receiving, via user input, a definition of an attribute in the CAD/GIS system;
automatically, without additional user input, creating at least one face with the CAD/GIS system within the site map, wherein the face is a closed polygon, wherein the face is created by creating at least one face boundary based on the start point and the attribute of the face defined within the CAD/GIS system, and wherein the face is created by rotating a line segment about the start point; and
displaying the face in the CAD/GIS system on a display device.

18. An article of manufacture comprising data embodied in a data storage device that is readable by and connected to a computer, and embodying one or more instructions executable by the computer to perform a method for automatically creating faces in a computer assisted design and geographic information (CAD/GIS) system, the method comprising:
defining a site map within the CAD/GIS system, where the site map is defined by at least one boundary and encloses a closed polygon;
defining a boundary of the site map within the CAD/GIS system to be used as a reference boundary;
defining a start point on the reference boundary within the CAD/GIS system;
receiving, via user input, a definition of an attribute in the CAD/GIS system;
automatically, without additional user input, creating at least one face with the CAD/GIS system within the site map, wherein the face is a closed polygon, wherein the face is created by creating at least one face boundary based on the start point and the attribute of the face defined within the CAD/GIS system, and wherein the face is created by the CAD/GIS system by sliding a line segment along the reference boundary.

19. The article of claim 17, wherein the attribute is a minimum size for the face.

20. An article of manufacture comprising data embodied in a data storage device that is readable by and connected to a computer, and embodying one or more instructions executable by the computer to perform a method for automatically creating faces in a computer assisted design and geographic information (CAD/GIS) system, the method comprising:
defining a site map within the CAD/GIS system, where the site map is defined by at least one boundary and encloses a closed polygon;
defining a boundary of the site map within the CAD/GIS system to be used as a reference boundary;
defining a start point on the reference boundary within the CAD/GIS system;
receiving, via user input, a definition of an attribute in the CAD/GIS system;
automatically, without additional user input, creating at least one face with the CAD/GIS system within the site map, wherein the face is a closed polygon, wherein the face is created by creating at least one face boundary based on the start point and the attribute of the face defined within the CAD/GIS system, and wherein the attribute is a minimum frontage along the reference boundary, and the face is created by creating a side of the face lying along the reference boundary such that the side of the face has a length at least that of the minimum frontage attribute.

21. The article of claim 17, wherein the attribute is a number of faces to be created by the CAD/GIS system.

22. The article of claim 17, wherein an area of the face size is increased by appending a remainder of area in the site map to the area of the face.

23. The article of claim 17, wherein the CAD/GIS system creates a line segment used to bound the face such that the line segment is perpendicular to the reference boundary.

24. The article of claim 17, wherein the CAD/GIS system creates a line segment used to bound the face such that the line segment is created at a specified reference angle.

* * * * *